United States Patent [19]
Jacob et al.

[11] Patent Number: 5,319,484
[45] Date of Patent: Jun. 7, 1994

[54] PHOTONIC TIME-DIVISION MULTIPLEXER AND DEMULTIPLEXER

[75] Inventors: Jean-Baptiste Jacob, Perros-Guirec; Guy Le Roy, Lannion; Jean-Michel Gabriagues, Le Val Saint-Germain, all of France

[73] Assignee: Alcatel Cit, Paris, France

[21] Appl. No.: 826,774

[22] Filed: Jan. 28, 1992

[30] Foreign Application Priority Data

Jan. 29, 1991 [FR] France .................. 91 00979

[51] Int. Cl.[5] ................................. H04J 14/00
[52] U.S. Cl. .................... 359/123; 359/117; 359/139; 370/50
[58] Field of Search ............... 359/117, 123, 128, 139, 359/140; 370/60, 50

[56] References Cited

FOREIGN PATENT DOCUMENTS 0282071 9/1988 European Pat. Off. ........ H04Q 3/52

OTHER PUBLICATIONS

Patent Abstracts of Japan, vol. 10, No. 228 (E-426)[2284], Aug. 8, 1986; & JP-A-61 61 956 (NTT) Mar. 29, 1986.
Patent Abstracts of Japan, vol. 10, No. 221 (E-424)[2277], Aug. 2, 1986; & JP-A-61 56 594 (NTT) Mar. 22, 1986.
Conference Record, IEEE Globa Telecommunications Conference & Exhibition, Hollywood, Fla., Nov. 28-Dec. 1, 1988, vol. 2, pp. 933-937; S. Suzuki et al.: "Photonic wavelength-division and time-division hybrid switching networks for large line-capacity broadband switching systems."
Proceedings of the National Communications Forum, Rosemont, Ill., Sep. 28-30, 1987, vol. XXXXI, Book II, pp. 1282-1295; T. Yasui: "Overview of photonic switching systems technology."

*Primary Examiner*—Leslie Pascal
*Attorney, Agent, or Firm*—Sughrue, Mion, Zinn, Macpeak & Seas

[57] ABSTRACT

A multiplexer and a demultiplexer time-division multiplex and demultiplex binary data in the form of cells having a fixed number of bits. For example, to time-division multiplex cells comprising 424 bits the original bit rate of a block of 16 bits of a cell is multiplied by four, each cell being divided into a series of 27 blocks. The blocks constituting each cell are concatenated after their bit rate has been multiplied. Similarly, the demultiplexer divides the bit rate by dividing each cell into blocks, separating consecutive blocks by a gap and dividing the bit rate successively in each block. The multiplexer and demultiplexer have applications in time-division multiplex telecommunication networks.

11 Claims, 5 Drawing Sheets

PHOTONIC TIME-DIVISION MULTIPLEXER AND DEMULTIPLEXER

BACKGROUND OF THE INVENTION

1. Field of the Invention

The invention concerns a photonic time-division multiplexer and a photonic time-division demultiplexer which can be used in telecommunication networks which use the asynchronous time-division multiplexing technique. In this technique binary data representing telephone calls, for example, is transmitted in the form of cells each comprising a fixed number of bits. Known type time-division multiplexers and demultiplexers are implemented using electronic components. The introduction of photonic components makes it possible to envision the implementation of photonic time-division multiplexers and demultiplexers. Photonic components are faster than electronic components and cater to spectral multiplexing.

An object of the invention is to propose a photonic time-division multiplexer and demultiplexer whose design is optimized to benefit from the performance capabilities of photonic components.

SUMMARY OF THE INVENTION

In a first aspect, the invention consists in a photonic time-division multiplexer for time-division multiplexing binary data received in the form of M series of spectrally multiplexed synchronous cells each of which has a fixed number of bits, the cells in each series being separated by gaps, comprising:

- means common to the M series for multiplying by a number K greater than one the initial bit rate of a block of B bits of a cell where B is a fixed number greater than one and less than the number of bits in a cell and each cell is divided into a series of blocks of B bits;
- means common to the M series for concatenating the blocks constituting each cell on the output side of the means for multiplying the bit rate of each block; and
- means for time-division multiplexing cells reconstituted by the concatenation means.

In a second aspect, the present invention consists of a photonic time-division demultiplexer for time-division multiplexing binary data received on P time-division multiplexed signals in the form of P series of cells each having a fixed number of bits, comprising:

- means for time-division multiplexing the cells received on the P time-division multiplexed signals;
- means for dividing each cell into blocks of B bits where B is a fixed number less than the number of bits in a cell and for separating two consecutive blocks by a gap whose duration is equal to $(K-1)$ times the duration of a block of B bits at the original bit rate where K is a number greater than 1; and
- means for dividing by K the bit rate of a block of B bits, each cell being processed as a series of blocks of B bits.

This multiplexer and demultiplexer are of reduced cost because the means for multiplying or dividing the initial data rate of a block of bits smaller than a cell comprise less components than the means for multiplying or dividing the initial data rate of a complete cell. The means for dividing a cell into blocks and the means for concatenating the blocks constituting a cell comprise additional components whose number increases in proportion to the number of blocks constituting each cell but an advantageous compromise can be found as to the number of blocks per cell and yields a device comprising much fewer components than if the bit rate multiplication or division means were to process a complete cell.

The invention will be better understood and other details will emerge from the following description and the accompanying drawings.

DETAILED DESCRIPTION OF THE INVENTION

In this embodiment 16 streams of cells are to be time-division multiplexed onto a single optical fiber by multiplying the initial bit rate of the cells by four and spectrally multiplexing the cells using four wavelengths also referred to as colors. This embodiment comprises a first stage 35 whose essential function is to multiplex the cells spectrally and then to multiply the bit rate, a second stage 37 whose essential function is to apply time-division multiplexing on receiving cells multiplexed by 16 colors on a single fiber and dividing them between four separate optical fibers without spectral multiplexing and a third stage 38 whose function is to apply further spectral multiplexing on receiving time-division multiplexed cells on four optical fibers and time-division and spectrally multiplexing them onto a single optical fiber. The optional third stage 38 is not required if only pure time-division multiplexing is required, as at the output of the second stage 37.

Figure 1:
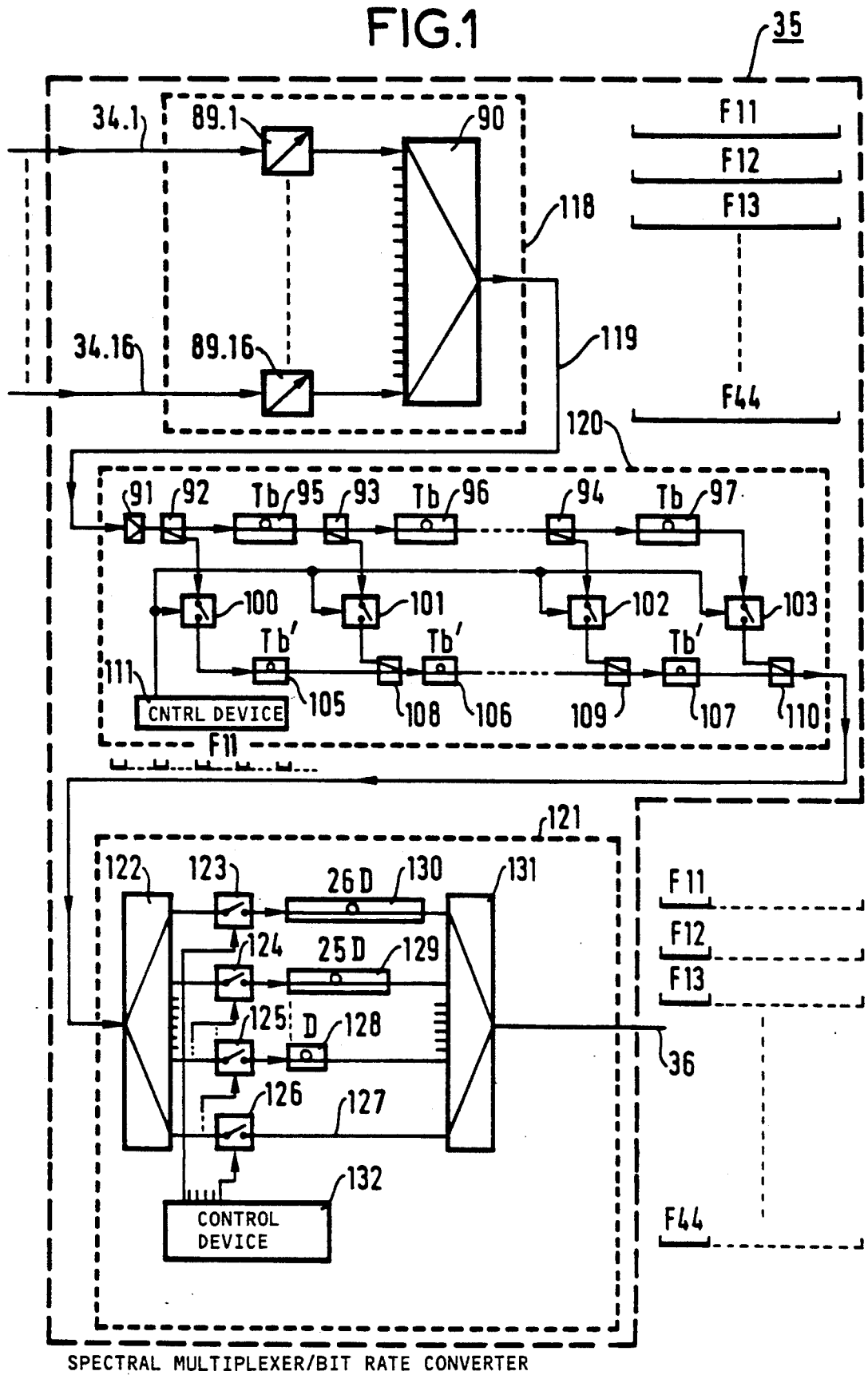
FIGS. 1, 2 and 3 respectively show three stages of one embodiment of the multiplexer in accordance with the invention.

FIG. 1 shows the block diagram of the first stage 35 of this embodiment. The first stage 35 receives on 16 optical fibers 34.1, ..., 34.16 cells of 424 bits with a bit rate of 622 Mb/s. The stage 35 comprises a part 118 carrying out spectral multiplexing using 16 different colors, a part 120 which carries out bit rate multiplication on blocks of 16 bits and a part 121 concatenating blocks of 16 bits whose bit rate has been multiplied by the part 120. The output of the part 121 constitutes the output of the stage 35 and supplies to a single optical fiber 36 cells spectrally multiplexed at 16 colors with a bit rate of 2.488 Gb/s. Two consecutive cells of the same color are separated by a gap whose duration is approximately equal to three times the cell duration at the bit rate of 2.488 Gb/s.

The part 118 comprises:
- 16 wavelength converters 89.1 through 89.16 having 16 inputs respectively connected to the 16 inputs of the multiplexer receiving cells via fibers 34.1 through 34.16; and
- a combiner 90 having 16 inputs respectively connected to the 16 outputs of the wavelength converters 89.1 through 89.16 and an output connected to an input of the part 120 by an optical fiber 119.

The cells supplied by the fibers 34.1, ..., 34.16 are synchronous and the part 118 supplies 16 superimposed synchronous cells that can be distinguished by their wavelength F11, F12, F13, ..., to the fiber 119.

The part 120 operates on blocks of 16 bits rather than on cells of 424 bits, which significantly reduces the number of components required to implement this bit rate converter stage. Each cell of 424 bits is divided into 27 blocks of 16 bits, the 27th block containing only eight wanted bits. The parts 120 and 121 process simultaneously 16 blocks of 16 different colors as the stage 118 carries out spectral multiplexing on 16 different colors.

The part 120 comprises:
an optical amplifier 91;
a set of 16 delay lines 95, 96, ..., 97 each introducing a time-delay equal to one bit period Tb at 622 Mb/s;
16 three-port couplers 92, 93, ..., 94;
a second set of delay lines 105, 106, ..., 107 each introducing a time-delay equal to one bit period T'b at 2.6 Gb/s;
16 three-input couplers 108, ..., 109, 110;
16 optical gates 100, 101, ..., 102, 103; and
a control device 111 controlling in parallel all the optical gates 100 through 103 with a period equal to the duration of 16 bits at 622 Mb/s.

The blocks of 16 bits supplied at the output of the part 120 are separated by gaps in which there is no bit with the result that each cell is no longer a continuous stream of 424 bits.

The function of the part 121 is to re-establish the continuity of the bits in each cell by concatenating the blocks of 16 bits. The part 121 comprises:
a splitter 122;
27 optical gates 123, 124, ..., 126;
a control device 127 electrically controlling the optical gates 123 through 126 independently of each other;
26 fixed delay lines 127, 128, ..., 129, 130 introducing respective time-delays equal to 0, D, 2.D, 3.D, ..., 25.D, 26.D where D is the difference between the durations of a block of 16 bits at 622 Mb/s and at 2.488 Gb/s;
a combiner 131 whose output constitutes the output of the part 121 and of the stage 35;

The splitter 122 has 27 outputs respectively connected to 27 inputs of the combiner 131 by 27 gates 123 through 126 in series with one of the delay lines 127 through 130.

For each cell the first block must be delayed by 26.D, the second by 25.D, and so on. The control device 132 controls the gates 123 through 126 in succession to pass the first block into the delay line 130, the second block into the delay line 129, and so on. The 27th block is passed directly by the gate 126 to the combiner 131. At the output of the combiner 131 each cell is again in the form of a continuous stream of 424 bits. Each cell has a different one of 16 colors and is at a bit rate of 2.488 Gb/s.

Spectral multiplexing on 16 colors provides for very efficient use of the parts 120 and 121 but is not suitable for later parts of the system, with the result that time-division multiplexing must be used. The function of the stage 37 is to time-division multiplex these cells onto four optical fibers to constitute four 2.488 Gb/s multiplexed signals that are not spectrally multiplexed.

Figure 2:
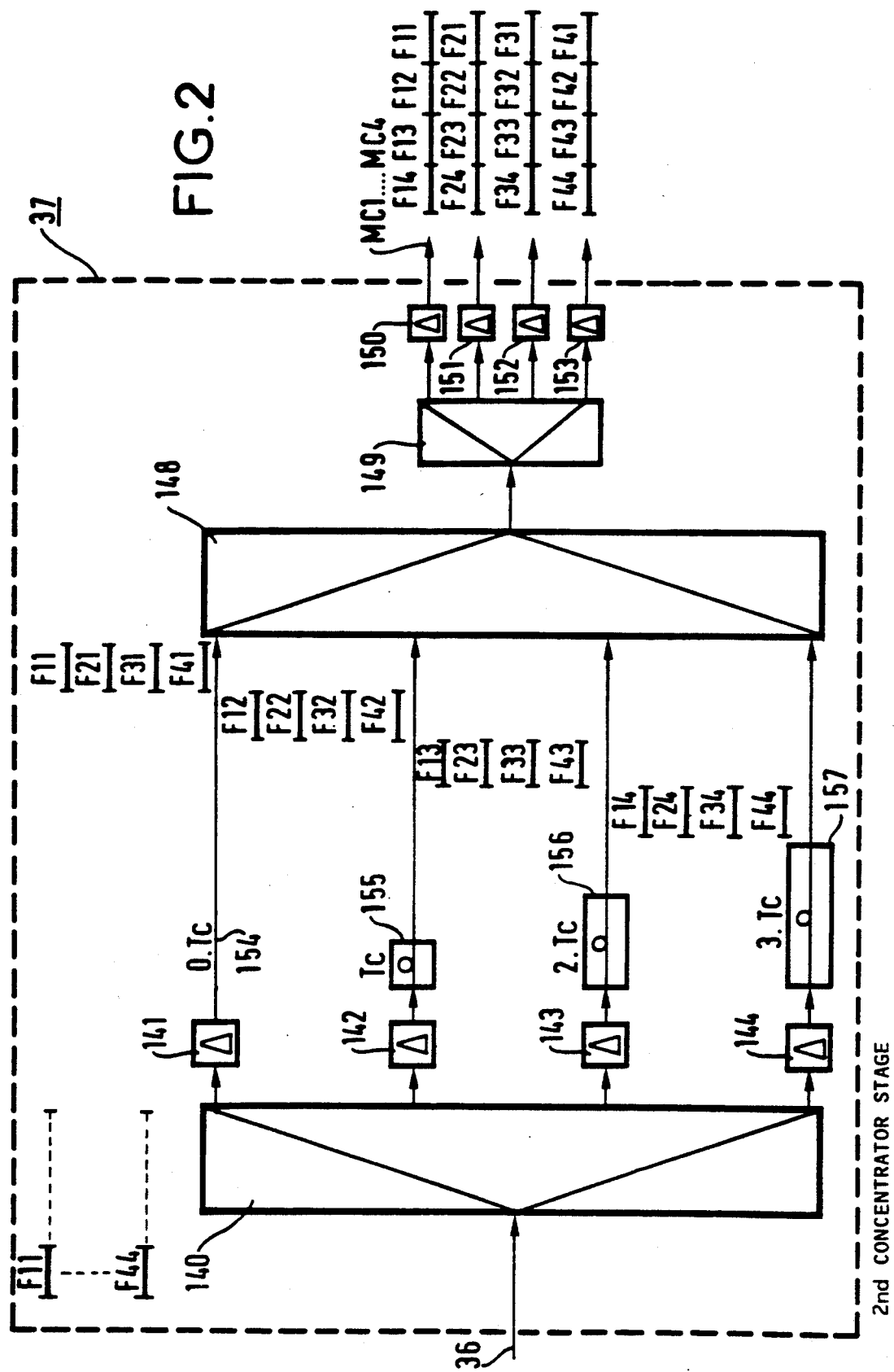

FIG. 2 shows the block diagram of one embodiment of stage 37. It receives 16 synchronous cells multiplexed by 16 different colors denoted F11, F12, F13, F14, F21, ..., F41, F42, F43, F44 from the fiber 36. Each packet of 16 cells is followed by a gap whose approximate duration is equal to three cell periods at 2.488 Gb/s.

This embodiment comprises:
a splitter 140;
a periodic filter 141 passing the colors F11, F21, F31, F41;
a periodic filter 142 passing the colors F12, F22, F32, F42;
a periodic filter 143 passing the colors F13, F23, F33, F43;
a periodic filter 144 passing the colors F14, F24, F34, F44;
four delay lines 154 through 157 introducing time-delays equal to 0, Tc, 2.Tc, 3.Tc where Tc is the cell period at 2.488 Gb/s;
a combiner 148;
a splitter 149;
a bandpass filter 150 passing the colors F14, F13, F12, F11;
a bandpass filter 151 passing the colors F24, F23, F22, F21;
a bandpass filter 152 passing the colors F34, F33, F32, F31; and
a bandpass filter 153 passing the colors F44, F43, F42, F41.

The splitter 140 has four outputs respectively connected to four inputs of the combiner 148 by four channels respectively comprising the filter 141, the filter 142 in series with the delay line 155, the filter 143 in series with the delay line 156 and the filter 144 in series with the delay line 157. The output of the combiner 148 is connected to the input of the splitter 149. The splitter 149 has four outputs respectively connected to four outputs of the stage 37 by the respective filters 150 through 153 to provide the multiplexed signals MC1, ..., MC4.

The four channels which connect the splitter 140 to the combiner 148 shift the cells to form four packets of four synchronous cells. The first channel passes on with no time-delay the cells having the colors F11, F21, F31, F41. The second channel passes on with a time-delay equal to the cell period the cells having the colors F12, F22, F32, F42. The third channel passes on with a time-delay equal to two cell periods the cells having the colors F13, F23, F33, F43. The fourth channel passes on with a time-delay equal to three cell periods the cells having the colors F14, F24, F34, F44.

The cells having the colors F11, F12, F13, F14 having been made successive and contiguous in time, it remains to route them onto a separate multiplex from the cells representing the other 12 colors. The function of the splitter 149 is to split the 16 color cells to the four filters 150 through 153 which divide them between four physically separate multiplexed signals MC1, ..., MC4 on four optical fibers. The filter 150 passes the four consecutive cells having the colors F14, F13, F12, F11. At the same time, the filter 151 passes the four consecutive cells having the colors F24, F23, F22, F21. At the same time, the filter 152 passes the four consecutive cells having the colors F34, F33, F32, F31. At the same time, the filter 153 passes the four consecutive cells having the colors F44, F43, F42, F41.

At output of the stage 37 the cells retain their various colors but no longer constitute a spectral multiplex. Each cell can be distinguished by the time slot and the multiplexed signal conveying it.

Figure 3:
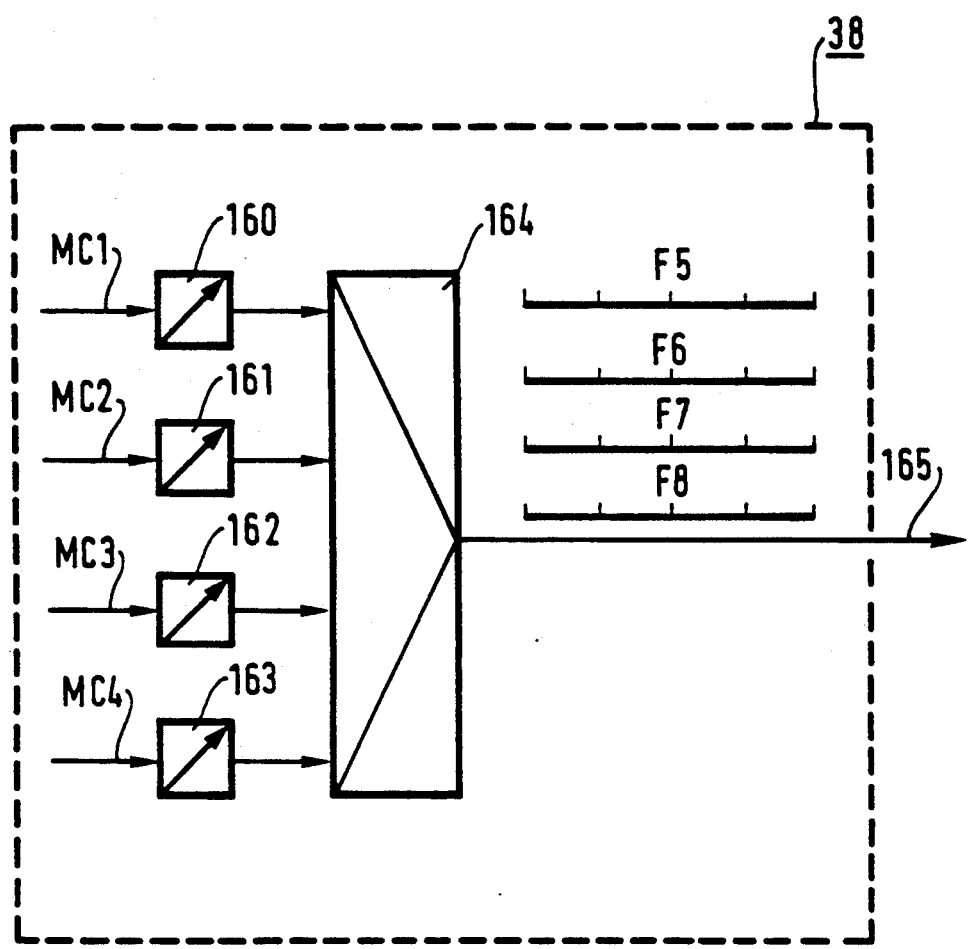

FIG. 3 shows the block diagram of the third stage 38 of this embodiment. It comprises:
four wavelength converters 160 through 163 having four inputs respectively receiving the four time-division multiplexed signals MC1 through MC4; and a combiner 164 having four inputs respectively connected to four outputs of the converters 160 through 163 and an output connected to an optical fiber 165 constituting the output of the stage 38 and the output of the demultiplexer.

The four multiplexed signals MC1, MC2, MC3, MC4 carry time-division multiplexed cells of any color not constituting a time-division multiplex. The function of the converters 160 through 163 is to assign four specific different colors F5, F6, F7, F8 respectively to the cells of the time-division multiplexed signal MC1, to the cells of the time-division multiplexed signal MC2, to the cells of the multiplexed signal MC3 and to the cells of the time-division multiplexed signal MC4. The combiner 164 superposes on the same fiber 165 the cells colored by the converters 160 through 163. The multiplexed signal carried by the fiber 165 is therefore a single time-division multiplexed signal which is also a spectral multiplexed signal.

Figure 4:
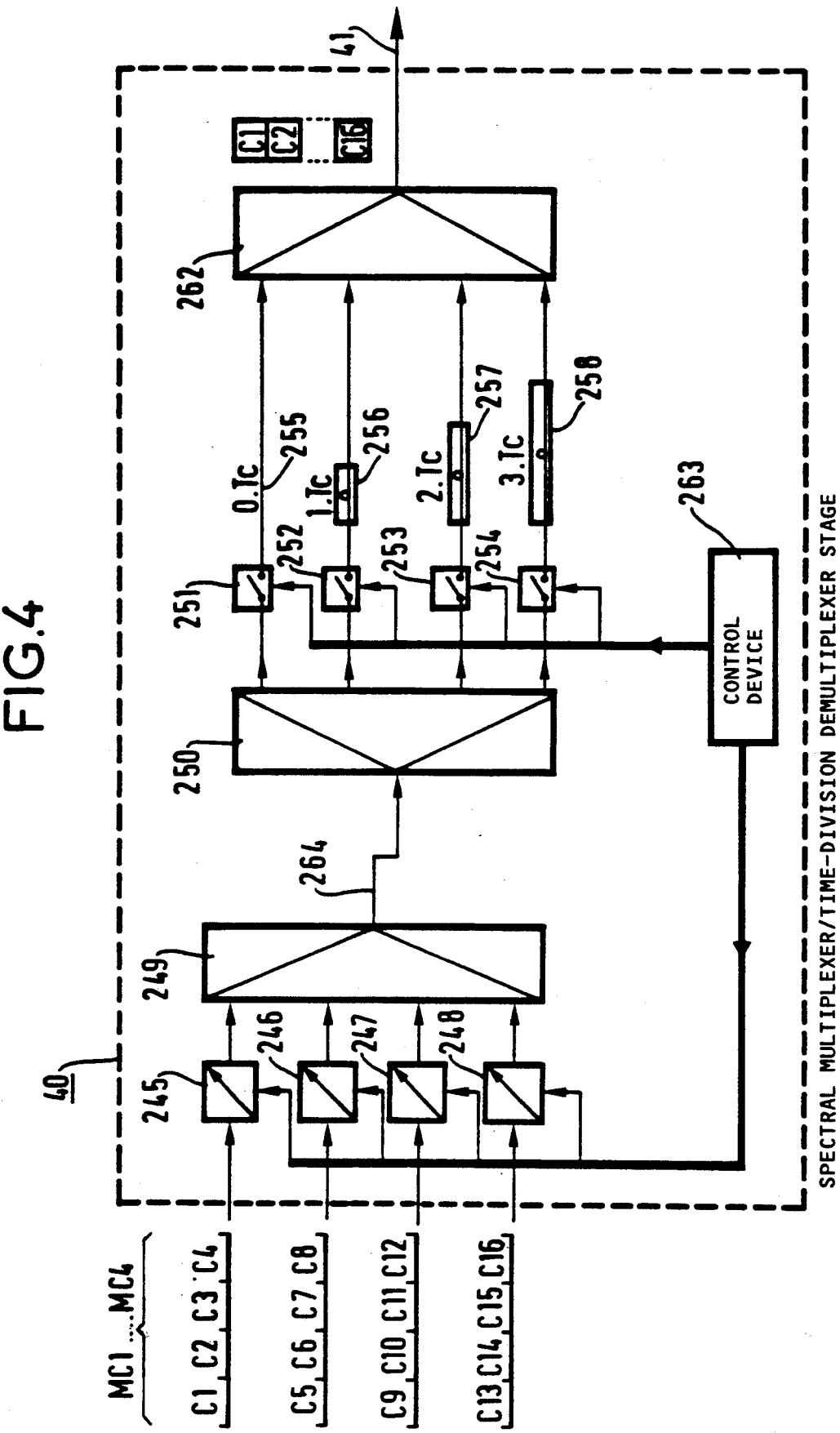
FIGS. 4 and 5 respectively show two stages of one embodiment of the demultiplexer in accordance with the invention.
Figure 5:
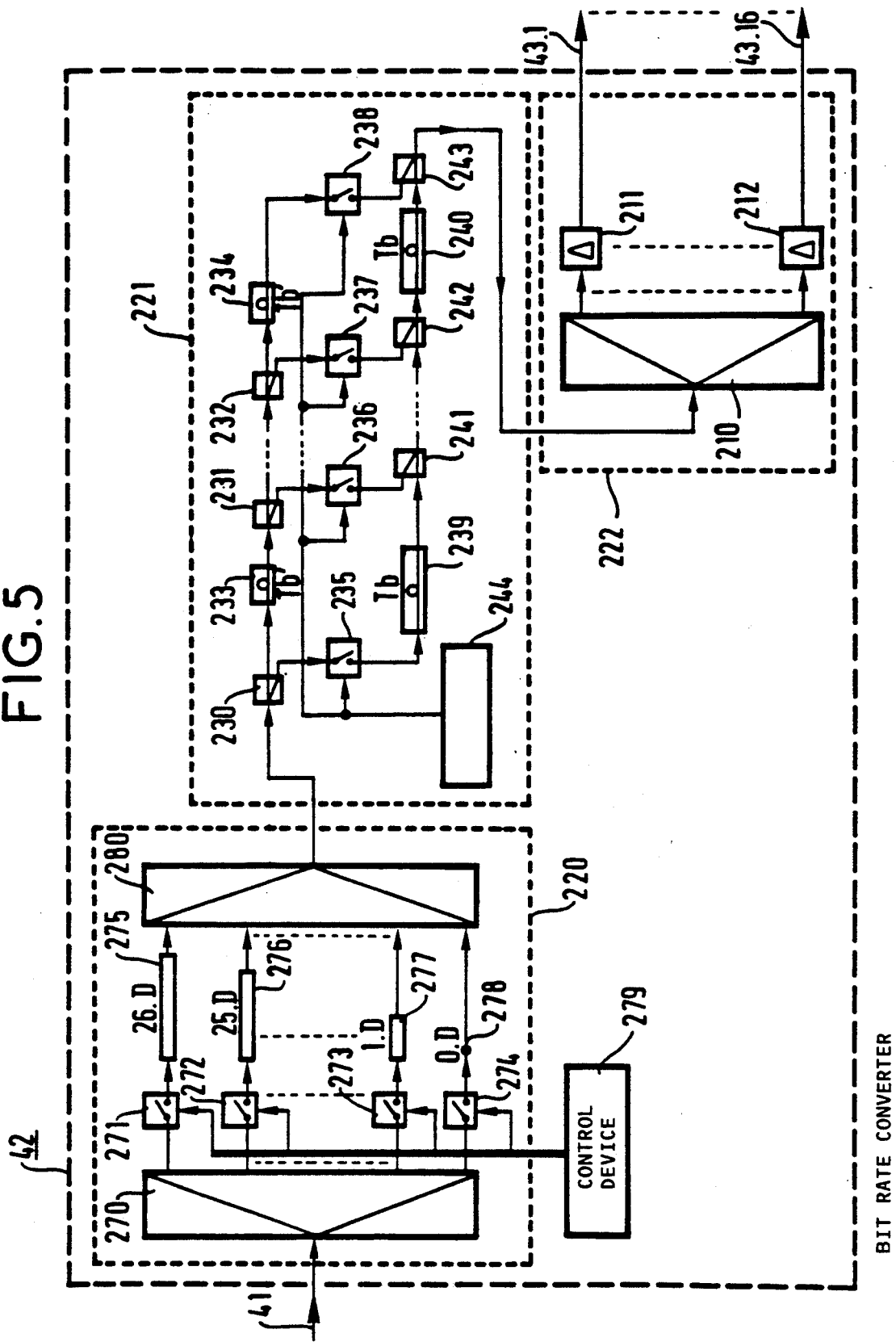

FIGS. 4 and 5 show one embodiment of a photonic time-division demultiplexer in accordance with the invention for demultiplexing four time-division multiplexed signals MC1, ..., MC4 each carrying a series of cells at a bit rate of 2.488 Gb/s, possibly of any color. Consider, for example, a time interval during which four cells arrive on each of these multiplexed signals. The cells C1, C2, C3, C4 arrive on the multiplexed signal C1. The cells C5, C6, C7, C8 arrive on the multiplexed signal M2. The cells C9, C10, C11, C12 arrive on the multiplexed signal MC3. The cells C13, C14, C15, C16 arrive on the multiplexed signal MC4.

FIG. 4 shows the block diagram of the spectral multiplex and time-division demultiplex stage 40. It receives on the four multiplexed signals MC1, ..., MC4 cells with any color at a bit rate of 2.488 Gb/s. It outputs on a single optical fiber 41 packets of 16 synchronous cells by spectral multiplexing onto 16 different colors at 2.488 Gb/s. Two consecutive packets of 16 cells are separated by a gap whose duration is equal to three cell periods. This stage comprises:

four wavelength converters 245 through 248 having four inputs respectively connected to the four multiplexed signals MC1, ..., MC4;

a combiner 249 having four inputs respectively connected to four outputs of the converters 245 through 248;

a splitter 250 having an input connected to the output of the combiner 249 and four outputs;

four electrically controlled optical gates 251 through 254;

a set of four delay lines 255 through 258 introducing respective time-delays equal to 0, Tc, 2.Tc, 3.Tc where Tc is the cell period at 2.488 Gb/s;

a combiner 262 having four inputs and an output constituting the output of the stage 40 connected to the fiber 41; and a control device 263 controlling each of the gates 251 through 254 independently and controlling each of the converters 245 through 248 independently.

Each output of the splitter 250 is respectively connected to an input of the combiner 262 by a gate 251, ..., 254 and a delay line 255, ..., 258.

Consider time-division demultiplexing:

a packet of four consecutive cells C1, C2, C3, C4 arriving on multiplexed signal MC1;

a packet of four consecutive cells C5, C6, C7, C8 arriving on multiplexed signal MC2;

a packet of four consecutive cells C9, C10, C11, C12 arriving on multiplexed signal MC3; and a packet of four consecutive cells C13, C14, C15, C16 arriving on multiplexed signal MC4;

these four packets arriving simultaneously.

The four cells from each packet are colored in succession by one of the converters 245 through 248 so that 16 different colors are assigned to the cells C1 through C16. The colors are assigned periodically at intervals of four cell periods.

The four cells of each packet are time-delayed by respective amounts equal to 0, Tc, 2.Tc, 3.Tc in order to make them synchronous with each other. To this end each gate 251 and 252 is opened in turn for the duration of a cell and periodically with a period equal to four cell periods Tc. Thus the cells C4, C8, C12, and C16, for example, are sent simultaneously by the gate 254 and are delayed simultaneously by the delay line 258 which introduces a time-delay equal to 3.Tc. They reach the combiner 262 at the same time as the cells C1, C5, C9, C13, for example which are transmitted simultaneously by the gate 251 and which are transmitted with a null time-delay by the line 255.

FIG. 5 shows the block diagram of the bit rate converter stage 42 in this embodiment. It is adapted to apply bit rate conversion in blocks of 16 bits rather than cell by cell, with a view to simplifying the implementation. However, the cells must be divided into 27 blocks of 16 bits first. The stage 42 therefore comprises a first part 220 dividing each cell into 27 blocks of 16 bits, a second part 221 carrying out the bit rate conversion block by block and a third part 222 comprising a splitter 210 and 16 filters 211, ..., 212 for spectrally demultiplexing each packet of 16 cells onto 16 output optical fibers 43.1 through 43.16.

The first part 220 comprises:

a splitter 270 having an input connected to the optical fiber 41 supplying cells at 2.488 Gb/s and having 27 outputs;

a combiner 280 having an output constituting the output of the first part 220 which is connected to an input of the second part 221 and 27 inputs;

27 electrically controlled optical gates 271, 272, ..., 273, 274;

27 delay lines 275, ..., 276, 277, 278 introducing time-delays respectively equal to 26.D, ..., D, 0 where D is the difference between the duration of a block of 16 bits at 622 Mb/s and its original duration at 2.488 Gb/s; and a control device 279 having outputs respectively connected to control inputs of the optical gates 271, ..., 274.

The 27 outputs of the splitter 270 are respectively connected to one of the 27 inputs of the combiner 280 by a channel comprising an optical gate in series with a delay line, one of which has a null time-delay.

The control device 279 successively opens the gates 271, ..., 274 to pass successively the 27 blocks of 16 bits constituting each cell. A first block is passed without any time-delay by the gate 274 and the direct connection. A second block is passed by the gate 273 to be stored and delayed in the delay line 277 introducing a time-delay representing a block of 16 bits. A third block is passed by a gate (not shown) into a delay line (not shown) introducing a time-delay representing two blocks of 16 bits, and so on. The 27th block is passed by the gate 271 to be stored in the delay line 275 for a duration representing 26 blocks of 16 bits. The first part 220 therefore passes blocks of 16 bits to the second part 221 and spaces them by a time-delay representing the duration of 16 bits, so that each block can be processed in the part 221 because the time available is equal to the duration of a block of 16 bits.

The design and operation of the part 221 are similar to those of the part 120 previously described and shown in FIG. 1. It converts the bit rate from 2.488 Gb/s to 622 Mb/s, for example. It comprises:

- a first series of 16 delay lines 233, ..., 234 each introducing a time-delay equal to one bit period Tb' at 2.488 Gb/s;
- 16 three-port couplers 230, 231. ..., 232 interleaved into the first series of delay lines;
- a second series of 16 delay lines 239, ..., 240 each introducing a time-delay equal to one bit period Tb at 622 Mb/s;
- 16 three-port couplers 241, 242, ..., 243, interleaved into the second series of delay lines;
- 16 optical gates 235, ..., 238 connecting the couplers interleaved into the first series of delay lines to the couplers interleaved into the second series of delay lines; and
- a control device 244 controlling in parallel all the gates 235, ..., 238 with a period equal to the duration of 16 bits at 2.488 Gb/s.

The part 222 spectrally demultiplexes the cells and therefore supplies 16 synchronous cells at 622 Mb/s on the respective 16 output fibers 43.1 through 43.16 of the demultiplexer.

The scope of the invention is not limited to the numbers of signals and to the bit rates specified hereinabove by way of example. The man skilled in the art may adapt the bit rate converter stages to multiply or divide the bit rate by an integer or non-integer factor.

There is claimed:

1. Photonic time-division multiplexer for time-division multiplexing binary data received in the form of M series of spectrally multiplexed synchronous cells, each of which has a fixed number of bits, the cells in each series being separated by gaps, comprising:
    means common to said M series for multiplying by a number K greater than one, the initial bit rate of a block of B bits of a cell where B is a fixed number greater than one and less than the number of bits in a cell, and each cell is divided into a series of blocks of B bits;
    means common to said M series for concatenating the blocks constituting each cell on the output side of the means for multiplying the bit rate of each block; and
    means for time-division multiplexing cells reconstituted by the concatenation means.

2. The photonic time-division multiplexer according to claim 1, wherein said means for multiplying by K the bit rate of a block of B bits comprises:
    a first series of B delay lines each introducing a time-delay equal to the duration of one bit of a cell at the original bit rate, one input of said first series constituting an input of said bit rate multiplier means;
    a second series of B delay lines each introducing a time-delay equal to 1/K times the duration of one bit of the cell at the original bit rate, one output of said second series of B delay lines constituting an output of said bit rate multiplier means;
    a set of B optical gates each coupled to one end of a delay line of said first series of B delay lines and to one end of a delay line of said second series of B delay lines; and
    control means for simultaneously opening all said optical gates periodically whenever a block of B bits is present in said first series of B delay lines in order to transfer each block into said second series of B delay lines.

3. The photonic time-division multiplexer according to claim 1, wherein each cell is divided into N blocks of B bits and said concatenation means comprises:
    a splitter having an input receiving in series the N blocks to be concatenated for each cell and N outputs;
    a combiner having N inputs and one output;
    N optical gates;
    N delay lines introducing N time-delays respectively equal to 0, D, 2.D, 3.D, ..., N.D where D is the duration difference of a block after multiplication of the bit rate, each output of said splitter being connected to an input of said combiner by one of said optical gates in series with one of said N delay lines; and
    control means for controlling the optical gates so as to open each gate in succession for a duration equal to the original duration of a block and so as to pass each block of a cell to a delay line introducing a time-delay decreasing in proportion to the rank of said block in said cell.

4. The photonic time-division multiplexer according to claim 1, wherein said time-division multiplexing means comprises:
    means for spectrally multiplexing onto a single optical fiber the M series of cells received on a plurality of input fibers before supplying them to said bit rate multiplier means, M cells received synchronously being multiplexed with M different wavelengths; and
    means for spectrally demultiplexing and for time-division multiplexing the cells reconstituted by said concatenation means.

5. The photonic time-division multiplexer according to claim 4, wherein said means for spectrally demultiplexing and for time-division multiplexing comprises:
    a splitter having an input receiving the cells reconstituted by said concatenation means and S outputs;
    a first combiner having S inputs and an output;
    S filters each passing S cell wavelengths;
    S delay lines introducing S time-delays respectively equal to 0, Tc, ..., S.Tc, where Tc is the duration of a cell after conversion of the bit rate, each output of said splitter being connected to an input of said combiner by one of said filters and one of said delay lines;
    a second splitter having an input connected to the output of said first combiner and M outputs; and
    M filters each passing S wavelengths and connected to the respective M outputs of said second splitter to supply time-division multiplexed signals.

6. The photonic time-division multiplexer according to claim 5, wherein said spectral demultiplexing and time-division multiplexing means further comprise:
    M wavelength converters receiving said M time-division multiplexed signals; and
    a second combiner having M inputs connected to outputs of said M wavelength converters and an output supplying a single time-division multiplexed signal.

7. Photonic time-division demultiplexer for time-division multiplexing binary data received on P time-division multiplexed signals in the form of P series of cells each having a fixed number of bits, comprising:

means for time-division demultiplexing the cells received on said P time-division multiplexed signals;

means for dividing each cell into blocks of B bits where B is a fixed number less than the number of bits in a cell and for separating two consecutive blocks by a gap, whose duration is equal to $(K-1)$ times the duration of a block of B bits at the original bit rate where K is a number greater than 1; and means for dividing by K the bit rate of a block of B bits, each cell being processed as a series of blocks of B bits.

8. The photonic time-division demultiplexer according to claim 7, wherein said means for dividing by K the bit rate of a block of B bits comprise:

a first series of B delay lines each introducing a time-delay equal to the duration of a bit of a cell at the origninal bit rate, one input of said first series receiving a series of blocks of bits whose bit rate is to be divided by K;

a second series of B delay lines each introducing a time-delay equal to K times the duration of a bit of a cell at the original bit rate, one output of said second series supplying a series of cells whose bit rate has been divided by K;

a set of B optical gates each connected to one end of a delay line of said first series and to one end of a delay line of said second series; and control means for simultaneously opening all of said optical gates periodically whenever a block of B bits is present in said first series of delay lines in order to transfer said block into said second series of delay lines.

9. The photonic time-division demultiplexer according to claim 7, wherein each cell is divided into N blocks of B bits and said means for dividing each cell and separating two consecutive blocks by a gap comprise:

a splitter having an input receiving a series of cells to be divided and N outputs;

a combiner having N inputs and one output supplying a series of separate blocks;

N optical gates;

N delay lines introducing N time-delays respectively equal to 0, D, 2.D, 3.D, ..., N.D where D is the duration difference of a block after the bit rate is divided, each output of said splitter being connected to an input of sid combiner by one of said optical gates in series with one of said delay lines; and control means for controlling the optical gates so as to open each gate in succession for a duration equal to the original duration of a block and so as to pass each block of a cell to a delay line introducing a time-delay decreasing in proportion to the rank of said block in said cell.

10. The photonic time-division demultiplexer according to claim 7, wherein said means for time-division demultiplexing comprises:

means for spectrally multiplexing onto a single optical fiber all the cells received on said P time-division multiplexed signals;

means for synchronizing said spectrally multiplexed cells on said single fiber before supplying them to said means for dividing the bit rate; and means for spectrally demultiplexing the cells reconstituted by said means for dividing the bit rate.

11. The photonic time-division demultiplexer according to claim 10, wherein said means for spectrally demultiplexing the cells comprises:

P wavelength converters each receiving one of said P time-division multiplexed signals;

a first combiner having P inputs respectively connected to outputs of said converters and an output supplying cells spectrally multiplexed with S different wavelengths to a single optical fiber;

and said means for synchronizing said spectrally multiplexed cells comprises:

a splitter having an input connected to the output of said first combiner and Q outputs;

a second combiner having Q inputs and an output supplying synchronized cells spectrally multiplexed by S wavelengths to a single optical fiber;

Q optical gates;

Q delay lines introducing respective time-delays equal to 0, Tc, 2.Tc, ..., Q.Tc where Tc is the duration of a cell before the bit rate is divided, each output of said splitter being connected to an input of said second combiner by one of said optical gates in series with one of said delay lines; and means for controlling said converters and said gates so as to assign S different wavelengths to Q consecutive cells on each of said P multiplexed signals and so as to delay each of said Q cells by a time-delay decreasing in proportion to the rank of said cell.

* * * * *